US009805441B2

(12) United States Patent
Kaehler

(10) Patent No.: US 9,805,441 B2
(45) Date of Patent: Oct. 31, 2017

(54) CONTROLLING EMBEDDED IMAGE DATA IN A SMART DISPLAY

(71) Applicant: Google Technology Holdings LLC, Mountain View, CA (US)

(72) Inventor: John W. Kaehler, Mundelein, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 226 days.

(21) Appl. No.: 14/148,841

(22) Filed: Jan. 7, 2014

(65) Prior Publication Data

US 2014/0192063 A1 Jul. 10, 2014

Related U.S. Application Data

(60) Provisional application No. 61/749,528, filed on Jan. 7, 2013.

(51) Int. Cl.

| | |
|---|---|
| ***G06T 1/60*** | (2006.01) |
| ***G06T 1/20*** | (2006.01) |
| ***G06F 3/147*** | (2006.01) |
| ***G09G 5/00*** | (2006.01) |

(52) U.S. Cl.

CPC ................ *G06T 1/60* (2013.01); *G06F 3/147* (2013.01); *G06T 1/20* (2013.01); *G09G 5/001* (2013.01); *G09G 2310/04* (2013.01); *G09G 2320/046* (2013.01); *G09G 2330/021* (2013.01); *G09G 2330/027* (2013.01)

(58) Field of Classification Search

None

See application file for complete search history.

(56) References Cited

U.S. PATENT DOCUMENTS

| | | | | |
|---|---|---|---|---|
| 6,236,413 | B1 * | 5/2001 | Gossett | G06T 1/20 345/426 |
| 7,256,788 | B1 | 8/2007 | Luu et al. | |
| 7,268,755 | B2 | 9/2007 | Selwan | |
| 7,734,936 | B2 | 6/2010 | Hamilton | |
| 7,750,912 | B2 | 7/2010 | Polzin et al. | |
| 8,463,333 | B2 | 6/2013 | StuivenWold | |
| 2006/0132474 | A1 * | 6/2006 | Lam | G09G 3/20 345/204 |

(Continued)

OTHER PUBLICATIONS

International Search Report and Written Opinion mailed May 28, 2014 in corresponding International Application No. PCT/US2014/010405.

*Primary Examiner* — Vu Nguyen

(74) *Attorney, Agent, or Firm* — Faegre Baker Daniels LLP

(57) ABSTRACT

A method and apparatus for controlling embedded raw image data within a display having internal memory. The method includes sending a frame of code and a final compilation of raw image data to the internal memory of the display from a primary host processor prior to the primary host processor entering a sleep state. When the primary host processor has entered a sleep state, control of the raw image data is redirected to at least one secondary host processor. The secondary host processor reads the frame of code within the internal memory of the display and instructs the display to perform an image-related behavior output that may include updating the display itself based on the frame of code found in the internal memory of the display.

19 Claims, 3 Drawing Sheets

(56) References Cited

U.S. PATENT DOCUMENTS

2007/0016810 A1* 1/2007 Ono ...................... G06F 1/3287 713/300
2008/0043002 A1 2/2008 Kaehler et al.
2008/0168285 A1* 7/2008 de Cesare ............. G06F 1/3203 713/320
2010/0162206 A1 6/2010 Roth et al.
2011/0164051 A1* 7/2011 Marcu .................... G09G 5/363 345/604
2012/0102342 A1* 4/2012 Haj-Yihia ............. G06F 1/3203 713/320

* cited by examiner

CONTROLLING EMBEDDED IMAGE DATA IN A SMART DISPLAY

FIELD OF THE DISCLOSURE

The present disclosure relates generally to display functions for a mobile computing device and more particularly to controlling display functions in a low power environment.

BACKGROUND

The display of notifications and other informative data upon a display screen of a mobile computing device provides timely and relevant information to a user of the mobile computing device. Often, when a device is in a stand-by state; that is the display is dark and not active with any displayable image output, flashing LEDs are used to indicate that a notification or other informative data exists for viewing. However, users may be overwhelmed by the number of flashing LEDs that may be associated with this informative data and be unable to discern quickly the meaning of the flashes or of the importance of the notification that triggered the flashing LEDs.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 2:
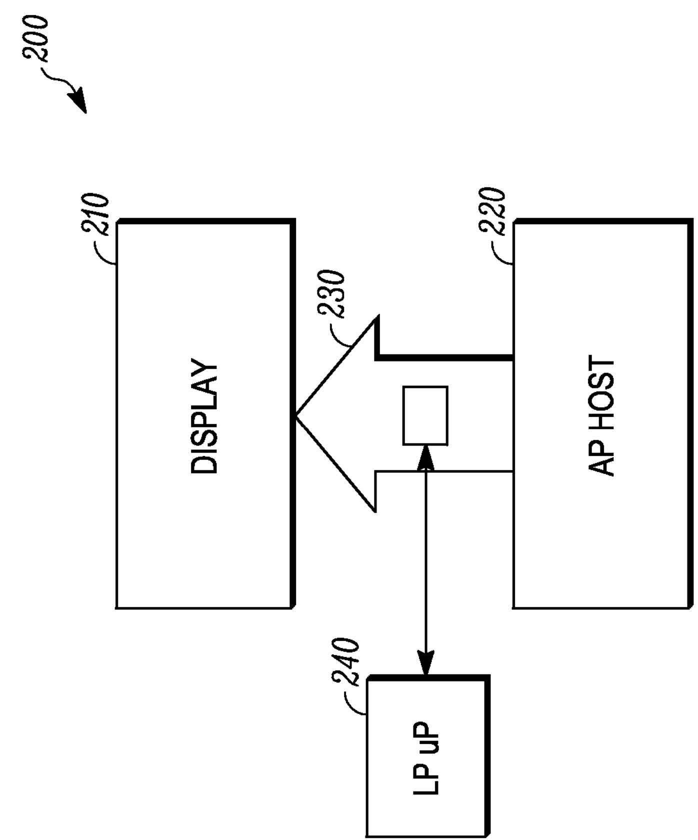
FIG. 2 illustrates explanatory display architecture in accordance with some novel embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed herein is a method for controlling embedded raw image data within a display having internal memory. The method includes sending a frame of code and a final compilation of raw image data to the internal memory of the display from a primary host processor prior to the primary host processor entering a sleep state. When the primary host processor has entered a sleep state, control of the raw image data is redirected to at least one secondary host processor. The secondary host processor reads the frame of code within the internal memory of the display and instructs the display to perform an image-related behavior output that may include updating the display itself based on the frame of code found in the internal memory of the display.

Figure 1:
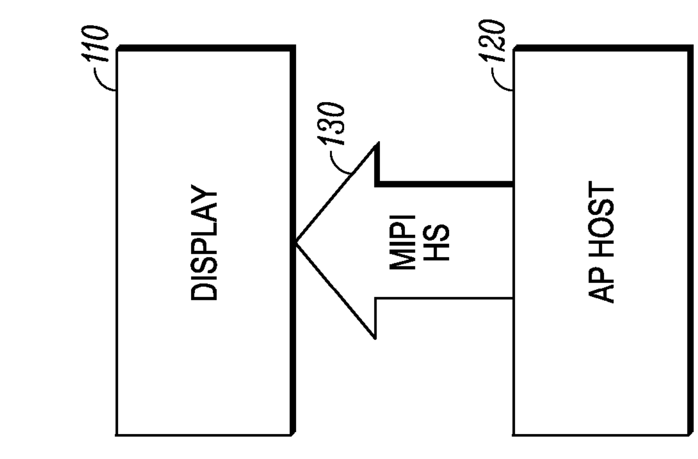
FIG. 1 is a block diagram of conventional display architecture in accordance with some embodiments.

Turning to FIG. 1, FIG. 1 illustrates, via an explanatory block diagram 100, of an electronic client device including a display coupled to an application processor 120 via a high speed switch or interface 130. Display 110 is configured without any internal memory or alternatively, may include internal memory, but the internal memory is not utilized or is under-utilized. Display 110 is capable of operating in a low power mode and may be an active-matrix display. The display 110 may include organic light emitting diodes (OLED).

Application processor (AP) 120 may act as a host for controlling the transmission of data to the display 110. AP 120 may run an operating system, a user interface, and applications for a mobile computing device. Other components beyond display 110 may also interface with AP 120 including, sensors, cameras, microphones, and storage modules. The transmission of data may have multiple modes and may be further controlled by high speed switch or interface 130. High speed switch or interface 130 may be configured to send data in a high speed mode using four data pairs and one clock pair, for example. High speed interface 130 may be a serial interface between display 110 and host AP 120. The interface 120 may be governed by protocols form one or more standard agencies or alliances, for example the MIPI Alliance, for handling pixel formats and data signals, as well as timing and commands to control display behaviors.

Referring to FIG. 2, a novel architecture 200 is shown for an electronic client device including a display 210 and the display having internal memory capable of receiving data and coded instructions for the display 210. An AP host 220 of the electronic client device is configured to control data transmission for the display 210 when the AP host 220 is awake and active. A low power host 230 is communicatively coupled to the AP host 220 and enables data transmission over pairs of data lines (e.g., 4 pairs, including one special pair of data lines for switch between high/low power). The low power host 230 is also communicatively coupled to a low power processor, such as a reduced instruction set computer (RISC) microprocessor, such as a commercially available processor developed by Advanced RISC Machines (ARM) that may have upwards of five data pairs for high speed transmission.

For one embodiment of the teaching described herein, a determination is made by the electronic client device that it is about to enter a standby state, which will cause the display 210 of the electronic client device to shut off. The AP host 220 disables the display output and writes one final frame of image data to the display's random access memory (RAM) before going to sleep. At this point, the LP host 230 acts as a switch and transfers control to the low power microprocessor 240. The image data may include an image displayed at a single location, or optionally several different locations for icon data to be presented on the display. Use of several different locations enables avoidance of screen burn-in. Low power (LP) microprocessor 240 controls the revealing or presenting of the icon on the display 210 and how often the icon is displayed. The control of the display is according to a frame of code and a final compilation of raw image data retrieved from the internal memory of the display while the low power processor controls. The exact appearance may vary, and the low power processor may for example control display of an icon (deemed as a notification for the user of the electronic client device) to fade in and fade out under different timing constraints. Such control of the revealing of the icon on the display results in behavior modification using the icon.

Figure 3:
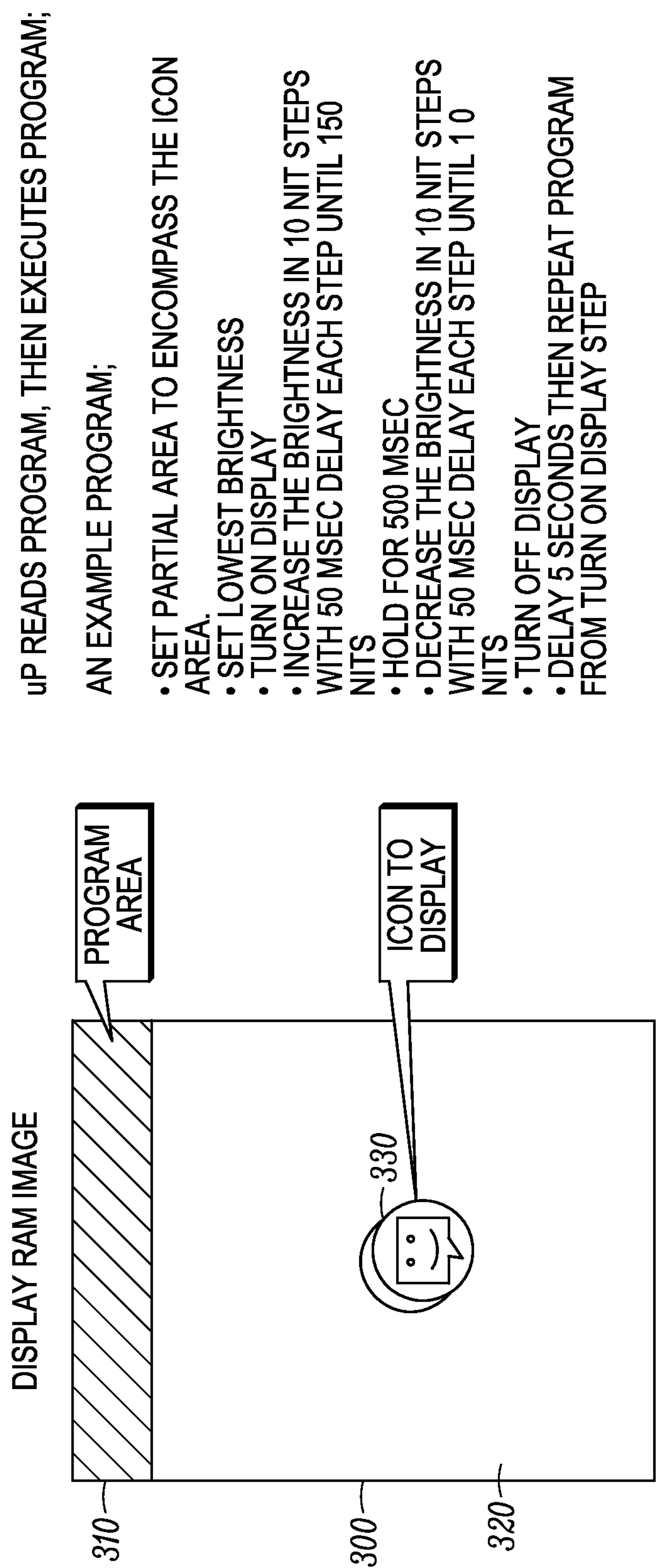
FIG. 3 shows a display capable of receiving embeddable display code for controlling an icon.

FIG. 3 illustrates a display screen 300 and display screen memory having a program area 310 wherein coded instructions for controlling the display panel 300 may be embedded in the display's internal memory. For example, the coded instructions may be stored in the least significant bits of a register in RAM. A revealing display area 320 is an area where an icon 330 is displayed in various ways according to behavior as determined by the embedded code instructions for the display panel 300. The low power processor 240 in FIG. 2 may read and execute the embedded code instructions from display memory to cause the icon 330 to be displayed. For example, the icon 330 may be revealed on the display area in a thin line that expands wider to simulate an eye opening, thus revealing the notification in a different, but useful manner to a viewer of the display panel 300.

The embedded coded instructions may control brightness (as measured in nits) in an example program:

Set partial reveal area of the display to encompass the icon area

Set lowest brightness value for the display

Turn on display

Increase the brightness of the display in 10 nit steps with a 50 msec delay for each step until 150 nits have been reached Hold for 500 msec Decrease the brightness in 10 nit steps with 50 msec delay each step until 10 nits have been reached Turn off display Delay for 5 seconds, then repeat program from the step where the display is turned on.

In order to control brightness levels for an OLED display, for example, several different lengthy gamma curves would be needed for each production line of the electronic client device. This would be necessary for every OLED formulation and for each sized of a display panel. The teachings herein allow for an embedded code of instructions that remain in the display's memory and that are programmed instruction codes for the gamma curves, thus alleviating the need for numerous gamma changes during development and production of the electronic client device.

Figure 4:
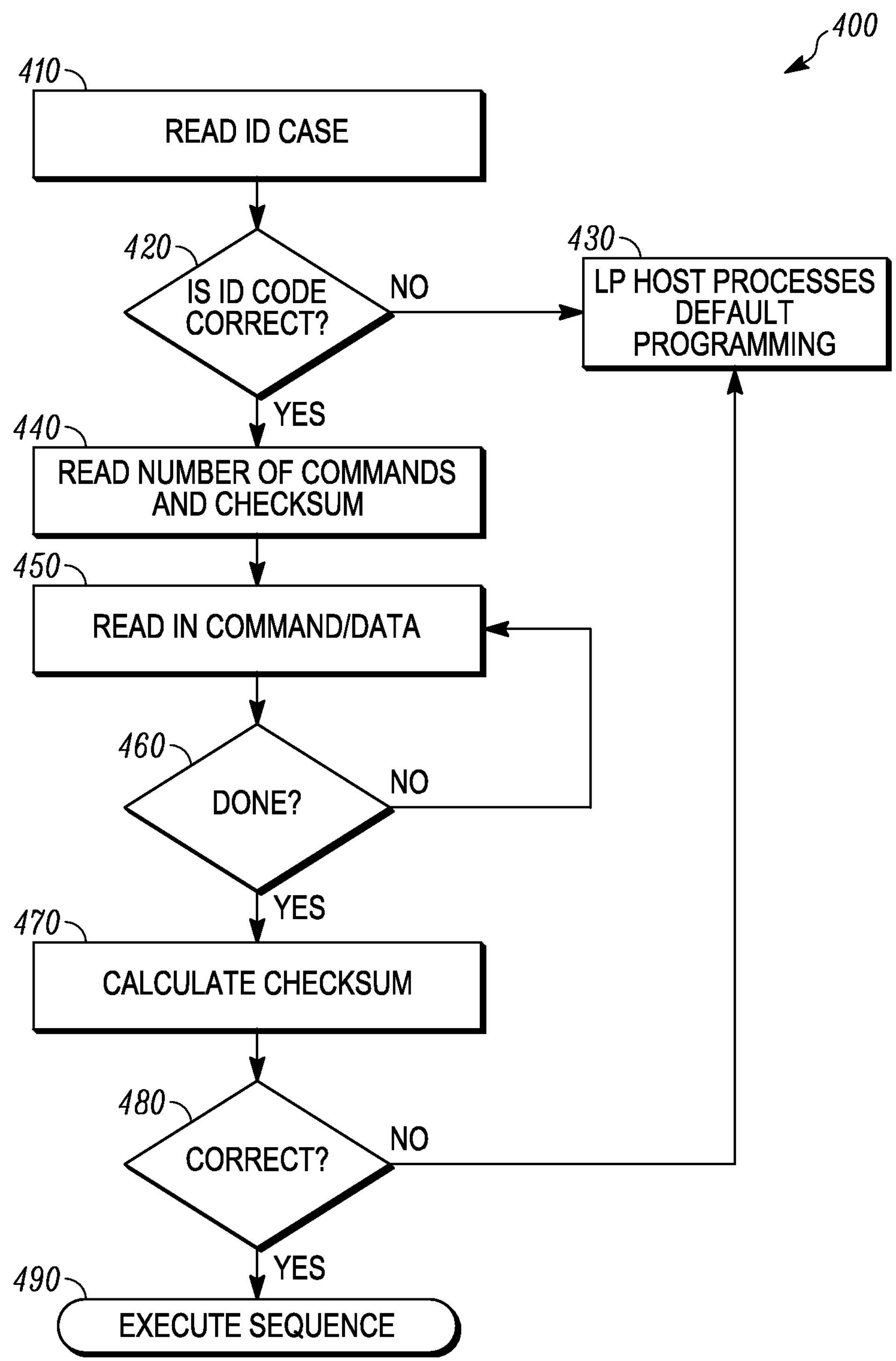
FIG. 4 is a flowchart in accordance with some embodiments.

FIG. 4 illustrates an explanatory flowchart 400, wherein a frame of code and a compilation of image data and including a display operation identification (ID) code is read 410 by the low power processor. An inquiry 420 on whether a correct ID code is read may result in the low power processor determining that a valid code is not received, and the processor executes 430 a default program for the display of the device. The default program can be embedded in memory at any point in the production process.

Responsive to a determination of a correct ID code, the low power processor 240 of the device reads 440 the number of commands, and optionally a checksum. The read operation 450 reads in the actual commands and/or data. A completion inquiry 460 continues the read 450 until then commands and data are read.

When the read operation is complete, calculation 470 of the optional checksum occurs to validate the instruction and/or data 480. If the command and/or data, and/or the optional checksum, are not validated, then the low power processor 240 executes 430 default programming for the display of the device.

If the frame of code and a final compilation of raw image data is valid, then a sequence is executed 490 for displaying notification in a manner that reveals information to a user of the device via the display of the device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for controlling embedded raw image data in an internal memory of a display, comprising:

sending from a primary host processor a frame of code and a final compilation of the raw image data to the internal memory of the display prior to the primary host processor going into a sleep state, wherein the frame of code includes instructions to control a brightness of the display, wherein the instructions to control the brightness of the display comprise:

instructions to increase the brightness of the display in first steps with a first delay between each of the first steps; and instructions to decrease the brightness of the display in second steps with a second delay between each of the second steps;

entering the primary host processor in the sleep state;

redirecting control of the internal memory of the display from the primary host processor to at least one secondary host processor in response to the primary host processor entering the sleep state;

reading, by the at least one secondary host processor, the frame of code located within the internal memory of the display; and instructing the display, by the at least one secondary host processor executing the retrieved frame of code, to perform an image-related behavior output comprising updating the display using the final compilation of the raw image data found in the internal memory of the display, wherein instructing the display comprises changing the brightness of the display.

2. The method according to claim 1, wherein the primary host processor remains free to perform additional functions unrelated to the updating of the display while awake, such that the display is operated by the at least one secondary host processor.

3. The method according to claim 1 further comprising storing additional frames of code in the at least one secondary host processor.

4. The method according to claim 1 further comprising periodically revealing a partial updated display.

5. The method according to claim 1 further comprising:

enabling bidirectional communication of the raw image data via a switch coupled to the at least one secondary host processor and the display; and disabling communication of the raw image data via the switch coupled to the primary host processor and the display.

6. The method according to claim 1 further comprising:

periodically, revealing one or more icons on a predetermined portion of the display.

7. The method according to claim 6 further comprising:

periodically, revealing a subset of the one or more icons on the predetermined portion of the display.

8. The method according to claim 1 wherein the frame of code comprises programmed gamma curves of the display.

9. The method according to claim 8 wherein the programmed gamma curves of the display correspond to at least one of an OLED-type display or an LCD-type display.

10. The method according to claim 1 wherein the frame of code includes instructions to fade the display, and wherein instructing the display, by the at least one secondary host processor executing the retrieved frame of code, to perform an image-related behavior output further comprises instructing the display to fade.

11. The method according to claim 1 wherein the final compilation of the raw image data includes an icon for display, wherein the frame of code includes instructions to set a partial reveal area of the display to encompass the icon in the partial reveal area of the display, and wherein instructing the display, by the at least one secondary host processor executing the retrieved frame of code, to perform an image-related behavior output further comprises setting the partial reveal area of the display to display the icon.

12. The method according to claim 1 wherein:

the frame of code includes further instructions to:

set the brightness of the display to a first brightness;

turn on the display;

increase the brightness of the display from the first brightness to a second brightness in first steps with a first delay between each of the first steps;

hold the brightness of the display at the second brightness for a first time period;

decrease the brightness of the display from the second brightness to a third brightness in second steps with a second delay between each of the second steps; and turn off the display; and instructing the display, by the at least one secondary host processor executing the retrieved frame of code, to perform an image-related behavior output further comprises:

setting the brightness of the display to the first brightness;

turning on the display;

increasing the brightness of the display from the first brightness to the second brightness in the first steps with the first delay between each of the first steps;

holding the brightness of the display at the second brightness for the first time period;

decreasing the brightness of the display from the second brightness to the third brightness in the second steps with the second delay between each of the second steps; and turn off the display.

13. An electronic device, comprising:

a display including an internal memory;

a primary host processor programmed to send a frame of code and a final compilation of the raw image data to the internal memory of the display prior to the primary host processor going into a sleep state, wherein the frame of code includes instructions to control a brightness of the display, wherein the instructions to control the brightness of the display comprise:

instructions to increase the brightness of the display in first steps with a first delay between each of the first steps; and instructions to decrease the brightness of the display in second steps with a second delay between each of the second steps; and a switch configured to redirect control of the internal memory of the display from the primary host processor to at least one secondary host processor in response to the primary host processor going into the sleep state, wherein the at least one secondary host processor is configured to read the frame of code from the internal memory and instruct the display to perform an image-related behavior output comprising updating the display according to the frame of code found in the internal memory of the display, wherein updating the display comprises changing the brightness of the display.

14. The electronic device according to claim 13, wherein additional frames of code are stored in the at least one secondary host processor.

15. The electronic device according to claim 13 wherein the switch is configured to enable decoupling of the primary host processor and enable bidirectional coupling of the at least one secondary host processor with the display.

16. The electronic device according to claim 15, wherein the switch is at least one of a single low power switch or a group of multiple high power switches.

17. The electronic device according to claim 13, wherein a partial section of the display is configured to periodically reveal a subset of icons.

18. The electronic device according to claim 13 wherein the at least one secondary host processor is a lower power processor than the primary host processor.

19. A method for controlling embedded raw image data in an internal memory of a display, comprising:

sending from a primary host processor a frame of code and a final compilation of the raw image data to the internal memory of the display prior to the primary host processor going into a sleep state;

entering the primary host processor in the sleep state;

redirecting control of the internal memory of the display from the primary host processor to at least one secondary host processor in response to the primary host processor entering the sleep state;

reading, by the at least one secondary host processor, the frame of code located within the internal memory of the display; and instructing the display, by the at least one secondary host processor executing the retrieved frame of code, to perform an image-related behavior output comprising updating the display using the final compilation of the raw image data found in the internal memory of the display, wherein the frame of code includes instructions to:

set a brightness of the display to a first brightness;

turn on the display;

increase the brightness of the display from the first brightness to a second brightness in first steps with a first delay between each of the first steps;

hold the brightness of the display at the second brightness for a first time period;

decrease the brightness of the display from the second brightness to a third brightness in second steps with a second delay between each of the second steps; and turn off the display; and wherein instructing the display, by the at least one secondary host processor executing the retrieved frame of code, to perform an image-related behavior output further comprises:

setting the brightness of the display to the first brightness;

turning on the display;

increasing the brightness of the display from the first brightness to the second brightness in the first steps with the first delay between each of the first steps;

holding the brightness of the display at the second brightness for the first time period;

decreasing the brightness of the display from the second brightness to the third brightness in the second steps with the second delay between each of the second steps; and turning off the display.

* * * * *